Sept. 2, 1941.  A. W. MORTON  2,254,489
CAMERA ATTACHMENT
Filed May 5, 1939  2 Sheets-Sheet 1
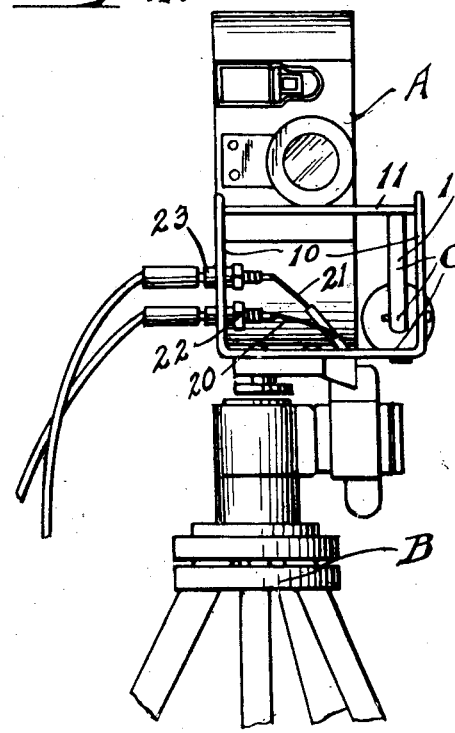
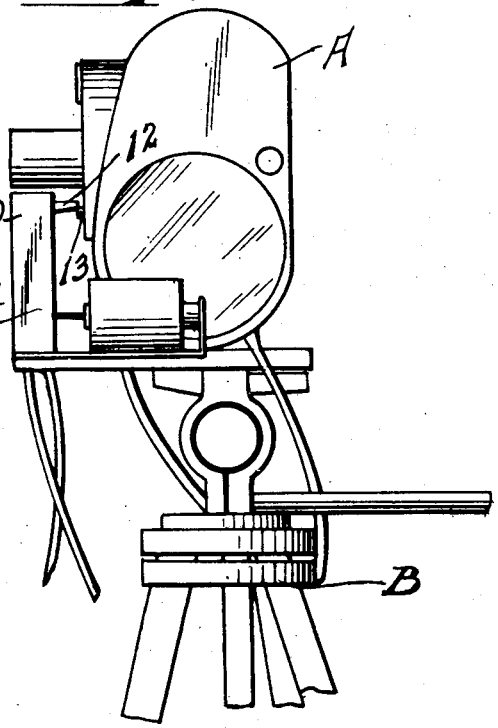
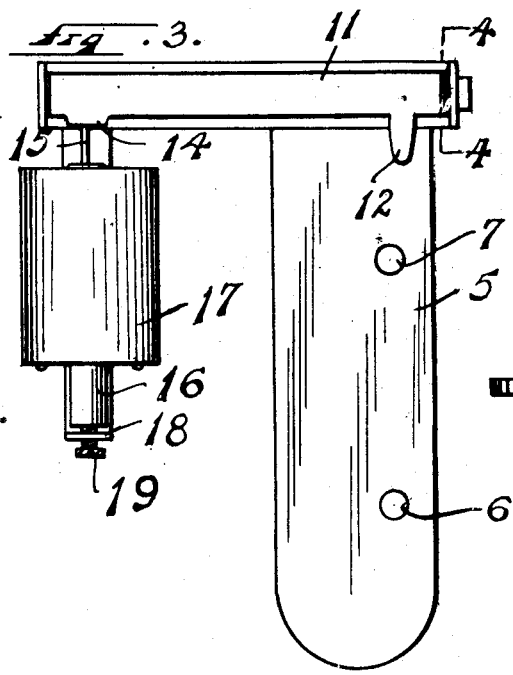
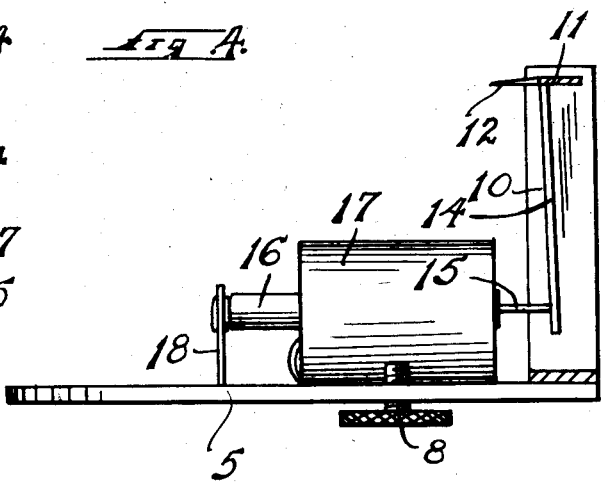
Inventor
Alton W. Morton
By P. M. Thomas
Attorney Sept. 2, 1941.  A. W. MORTON  2,254,489
CAMERA ATTACHMENT
Filed May 5, 1939  2 Sheets-Sheet 2

Inventor
Alton W. Morton
By R. M. Thomas
Attorney

Patented Sept. 2, 1941

2,254,489

UNITED STATES PATENT OFFICE 2,254,489

CAMERA ATTACHMENT

Alton W. Morton, Salt Lake City, Utah

Application May 5, 1939, Serial No. 271,892

1 Claim. (Cl. 88—16)

My invention relates to control devices for moving picture cameras and has for its object to provide a remote camera control which may be used to start or stop a moving picture camera from any distance, the distance being governed only by the length of the cord or wire used and the size of battery used for electrical energy.

A further object is to provide an electrically controlled remote control device to start or stop a moving picture camera from any distance while the person controlling the camera may or may not be in the field of vision of the camera as desired.

A still further object is to provide a simplified type of moving picture camera control having few parts that can be manufactured economically and being made so simple that it will not get out of order or be easily broken.

These objects I accomplish with the device illustrated in the accompanying drawings in which similar numerals and letters of reference indicate like parts throughout the several views and as described in the specification forming a part of this application and pointed out in the appended claim.

In the drawings in which I have shown my device

Figure 1 is a front elevation of a camera set on a tripod showing my remote control device in use.

Figure 2 is a side elevation of Figure 1.

Figure 3 is a plan view of the control removed from the camera.

Figure 4 is a side elevation of Figure 3.

Figure 5:
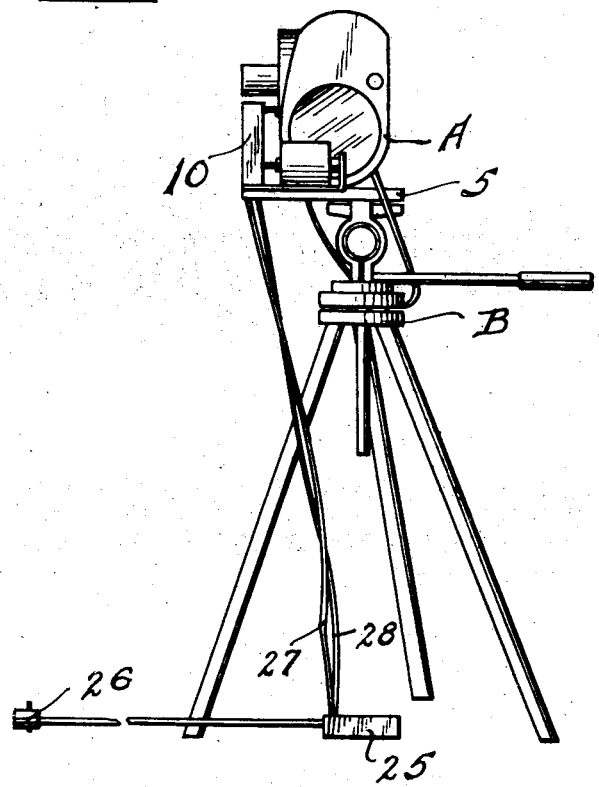
Figure 5 shows the use of the device.
Figure 6:
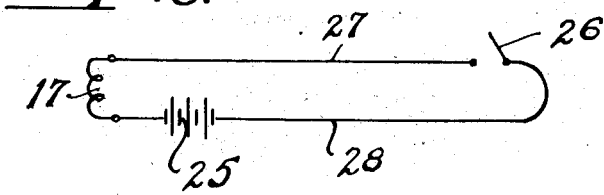
Figure 6 is a diagrammatic view of the wiring system utilized in my invention.

In the drawings I have shown the camera as A, the tripod as B and with my camera control shown as C. The control shown consists of a flat base plate 5, having a hole 6 threaded to receive the standard screw of a tripod and a hole 7 bored to carry a camera clamp screw 8, which screw is inserted into a hole in the bottom of the camera to hold it in rigid place on the base for taking pictures.

On the front end of the base plate 5 I mount upwardly extended U-shaped bracket 10, the legs of which extend up and across the space between the legs, the control bar 11 is mounted with the ends of the bar made round and carried in holes in the top ends of the legs of the brackets. This control bar has a finger 12 extended from one side and near one end thereof toward the camera when in place on the base plate and this finger trips the trigger 13 of the camera A starting it taking pictures and holding it down as long as the user desires, releasing it when desired, and stopping the camera. The control bar 11 has a control operating arm 14 extending downwardly from the opposite end thereof the trigger spring returning the finger to normal position when the arm is not in operation.

The arm 14, the finger 12, and the bar 11, are operated by small rod 15 extending from the center of a movable core 16 of a solenoid 17. The solenoid 17 is mounted on a bracket 18 along one side of the base plate 5 but spaced therefrom sufficient distance to permit the camera being placed thereon. The core of the solenoid is stopped by turning up the end of the bracket 18 and an adjustment screw 19 may be screwed through a threaded hole in the end of the bracket 18 to permit for adjustment of the screw of the solenoid. This may or may not be used as desired or required. Wires 20 and 21 lead from the solenoid to bannana type of plugs or connecting sockets 22 and 23 which are mounted through one leg of the bracket 10.

The source of electrical energy for operating the device is derived from dry cell batteries carried in a battery box 25 with a hand controlled throw switch 26 for controlling the current connected in series with the batteries in the box and wires 27 and 28 having plugs thereon to be inserted in the sockets 22 and 23.

It will be obvious that the length of the finger, the spacing of the holes, and the elevation of the finger above the base plate, will necessarily have to be varied with the different makes of cameras made, that shown in the drawings being a Bell & Howell film camera, but it is desired to use this with any movie type of camera, and such modifications and variations in dimensions as will be necessary to fit the other makes is considered within the spirit of the invention and scope of the claim.

Having thus described my invention I desire to secure by Letters Patent and claim:

A control for cameras comprising a base plate to be secured onto the bottom of the camera; a U-shaped bracket at the front of said base plate; a lever pivotally suspended from said bracket having a finger extended from one side to engage the trigger of the camera and hold it down as desired; a solenoid mounted on a bracket adjacent said base plate with the solenoid to actuate said lever when electrical current is passed through the solenoid; a battery box carrying electrical batteries; wires connecting the batteries in the box with the solenoid and with a switch; and a manually controlled switch connected with said wires to complete the electric circuit and actuate the solenoid as desired permitting the camera to run as long as the switch is held open.

ALTON W. MORTON.